US 11,231,553 B2

(12) United States Patent
Childers et al.

(10) Patent No.: US 11,231,553 B2
(45) Date of Patent: Jan. 25, 2022

(54) APPARATUS AND METHOD FOR ARRAYING OPTICAL FIBERS SIDE BY SIDE ON A PITCH GREATER THAN THE DIAMETER OF THE FIBER

(71) Applicant: US Conec, Ltd, Hickory, NC (US)

(72) Inventors: Darrell R. Childers, Hickory, NC (US); Jillcha F. Wakjira, Hickory, NC (US); Craig M. Conrad, Hickory, NC (US); Arnold Deal, III, Hildebran, NC (US); Charles L. Bass, III, Maiden, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 17/270,030

(22) PCT Filed: Aug. 27, 2019

(86) PCT No.: PCT/US2019/048378
§ 371 (c)(1),
(2) Date: Feb. 21, 2021

(87) PCT Pub. No.: WO2020/046965
PCT Pub. Date: Mar. 5, 2020

(65) Prior Publication Data
US 2021/0333480 A1    Oct. 28, 2021

Related U.S. Application Data

(60) Provisional application No. 62/723,578, filed on Aug. 28, 2018.

(51) Int. Cl.
G02B 6/38 (2006.01)
(52) U.S. Cl.
CPC ......... G02B 6/3839 (2013.01); G02B 6/3861 (2013.01)

(58) Field of Classification Search
CPC .......................... G02B 6/3839; G02B 6/3861
See application file for complete search history.

(56) References Cited

U.S. PATENT DOCUMENTS 5,867,620 A    2/1999    Bunin et al.
6,045,269 A    4/2000    Watanabe et al.
(Continued)

FOREIGN PATENT DOCUMENTS

CN    104749708 A    7/2015
WO    2018102706 A1    6/2018
WO    2019077472 A1    4/2019

OTHER PUBLICATIONS

International Search Report For PCT/US19/48378, dated Nov. 21, 2019, 2 pages.
(Continued)

Primary Examiner — Sung H Pak
Assistant Examiner — Hoang Q Tran
(74) Attorney, Agent, or Firm — Michael L. Leetzow, P.A.; Shubhrangshu Sengupta

(57) ABSTRACT

An optical fiber arranging tool has a base, a top surface, and a recessed channel extending along the base and has a plurality of ribs disposed within the recessed channel. The plurality of ribs have a pitch of 250 microns creating a plurality of grooves for receiving the optical fibers. The tool may also have a latch, there being a slot between the top surface of the base and an underside of the latch and in communication with the recessed channel. A method for aligning the optical fibers includes sliding individual optical fibers into a slot and the recessed channel, moving an object along the optical fibers in the recessed channel, passing the individual optical fibers through a respective one of a plurality of grooves created by ribs within the recessed channel and maintaining the individual optical fibers at a distance of 0.250 mm.

19 Claims, 11 Drawing Sheets

(56) References Cited

U.S. PATENT DOCUMENTS

| | | |
|---|---|---|
| 7,606,453 B2 | 10/2009 | Tanaka et al. |
| 9,128,214 B2 | 9/2015 | Wakjira et al. |
| 2005/0031831 A1 | 2/2005 | Bullesfeld et al. |
| 2005/0158005 A1 | 7/2005 | Otsuka et al. |
| 2010/0202735 A1 | 8/2010 | Childers et al. |
| 2012/0014649 A1 | 1/2012 | Duis et al. |
| 2012/0257860 A1 | 10/2012 | Li et al. |
| 2013/0202253 A1 | 8/2013 | Rosenberg et al. |
| 2014/0169743 A1 | 6/2014 | Hodge et al. |
| 2017/0045700 A1* | 2/2017 | Conrad ................ G02B 6/4471 |
| 2020/0249390 A1 | 8/2020 | Kanno |

OTHER PUBLICATIONS

Written Opinion of International Searching Authority for PCT/US19/48378, dated Nov. 21, 2019, 6 pages.

* cited by examiner

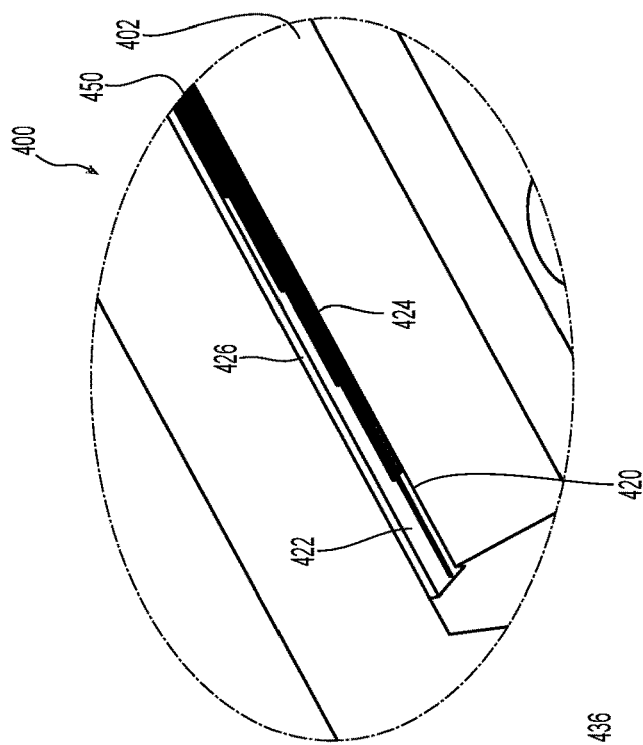
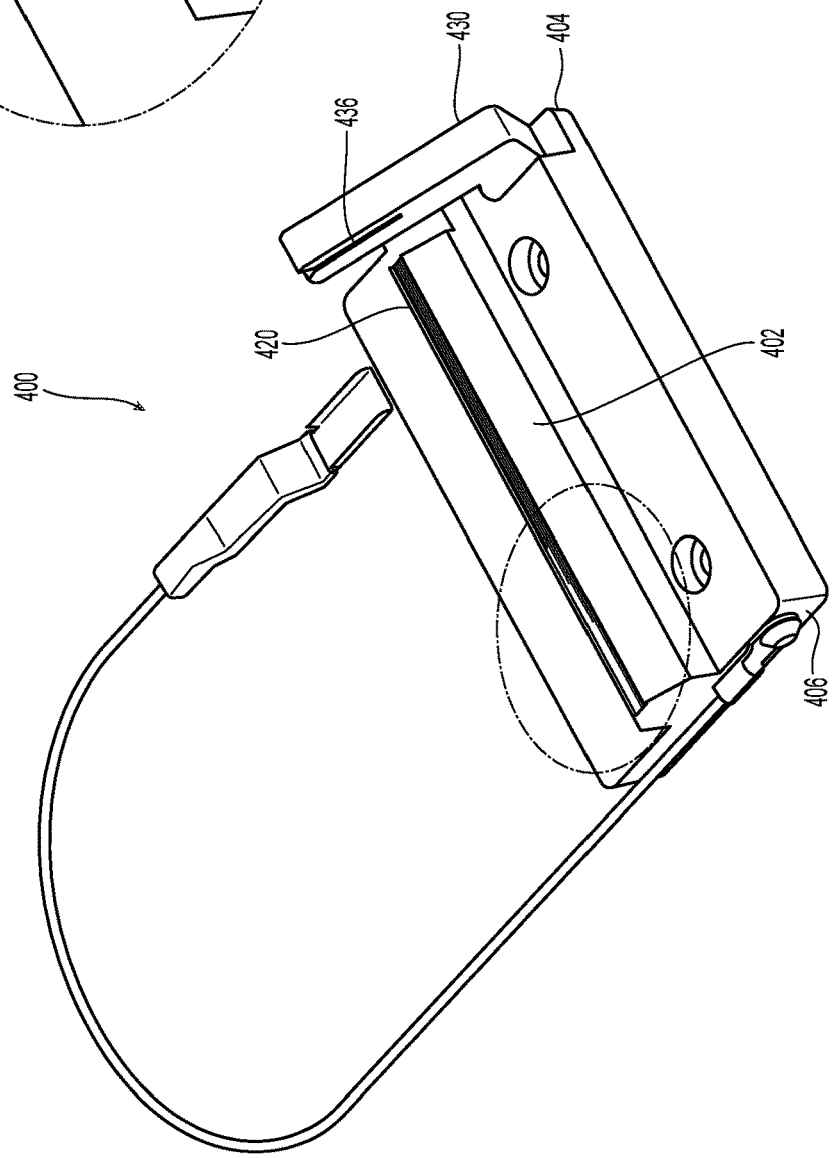

APPARATUS AND METHOD FOR ARRAYING OPTICAL FIBERS SIDE BY SIDE ON A PITCH GREATER THAN THE DIAMETER OF THE FIBER

This application claims priority of U.S. Provisional Patent Application Ser. No. 62/723,578, filed on Aug. 28, 2018, the contents of which are incorporated by reference.

BACKGROUND OF THE INVENTION

Field of the Invention

The areas that are used for placing and terminating optical fibers are getting more and more limited, while the demand for having optical fibers is getting larger. As a result, changes are needed to allow more optical fibers to be present. One possibility is to use more space for the optical fibers, but there is only so much space available. Another is to put more optical fibers in the same amount of space (i.e., conduits). Putting more optical fibers in the same space means that the cables that contain the optical fibers and the optical fibers themselves need to be smaller. Newer, smaller optical fibers (e.g., new 200-micron or smaller coated optical fibers) are now available. Using this new optical fiber allows for a large reduction in the size of the cable and thus a higher density of cables in the same space. However, the installed equipment is all based on the 250 micron optical fibers, so the equipment is designed for the 250 micron optical fibers that have a 250 micron pitch. Thus, it is difficult to use the smaller, newer optical fibers with the older equipment without some changes to the way that the equipment is used. The new optical fibers (200 micron) have to be arranged and presented on a 250 micron pitch. In this way, the new optical fibers can be backward compatible—used with the fiber optic ferrules and connectors that use the 250 micron optical fibers. To arrange these smaller optical fibers to be used with the older equipment, the optical fibers need to be held together with a 250 micron pitch.

A tool and a method have been invented that allows for the smaller diameter optical fibers to be held together in their proper order for termination.

SUMMARY OF THE INVENTION

The present invention is directed to an optical fiber arranging tool that includes a base having a front end, a rear end, a top surface, a bottom surface, and a recessed channel extending along the base from the rear end to the front end of the base, the recessed channel having a portion of the top surface on either side thereof, a latch extending from the top surface of the base on one side of the recessed channel and across the recessed channel to a second side of the recessed channel, there being a slot between the top surface of the base and an underside of the latch and in communication with the channel, and a plurality of ribs disposed within the recessed channel having a pitch of 250 microns creating a plurality of grooves at the front end.

In some embodiments, the recessed channel has a bottom surface and two side walls, the bottom surface being at least half a fiber diameter below the top surface of the base.

In some embodiments, the recessed channel has a first width at the rear end and a second width at the front end, the first width being smaller than the second width.

In some embodiments, the the recessed channel has central axis at the rear end, one of the side walls being parallel to the central axis along the length of the recessed channel.

In another aspect, the invention is directed to a method for arranging optical fibers at a pitch greater than a diameter of the optical fibers in tool having a base with a top surface and a recessed channel in the base with a portion of the top surface on either side of the recessed channel, the method that includes sliding individual optical fibers one by one into a slot and into the recessed channel, moving an object along the optical fibers in the recessed channel (and the top surface) from the slot towards an end of the base, passing the individual optical fibers through a respective one of a plurality of grooves created by ribs within the recessed channel, and maintaining the individual optical fibers at a distance of 0.250 mm at an end of the recessed channel.

In some embodiments, the method also includes applying an adhesive to the optical fibers inside the recessed channel, inserting the arranged optical fibers into an MT fiber optic ferrule, and terminating the MT fiber optic ferrule.

According to another aspect, the present invention is directed to an optical fiber arranging tool that includes a base having a recessed channel extending along the base from adjacent a rear end to a front end of the base, a stacker associated with the base at the front end, there being a slot in the stacker to receive optical fibers to be arranged, the slot having a width that is less than twice the diameter of the optical fibers, and a plurality of grooves disposed within the recessed channel having a pitch of 250 microns at the front end.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 12 is perspective view of another embodiment of an optical fiber arranging tool according to the present invention; and FIG. 13 is an enlarged view of a portion of the recessed channel and ribs in the optical fiber arranging tool in FIG. 12.

DETAILED DESCRIPTION OF THE PREFERRED EMBODIMENTS

Figure 1:
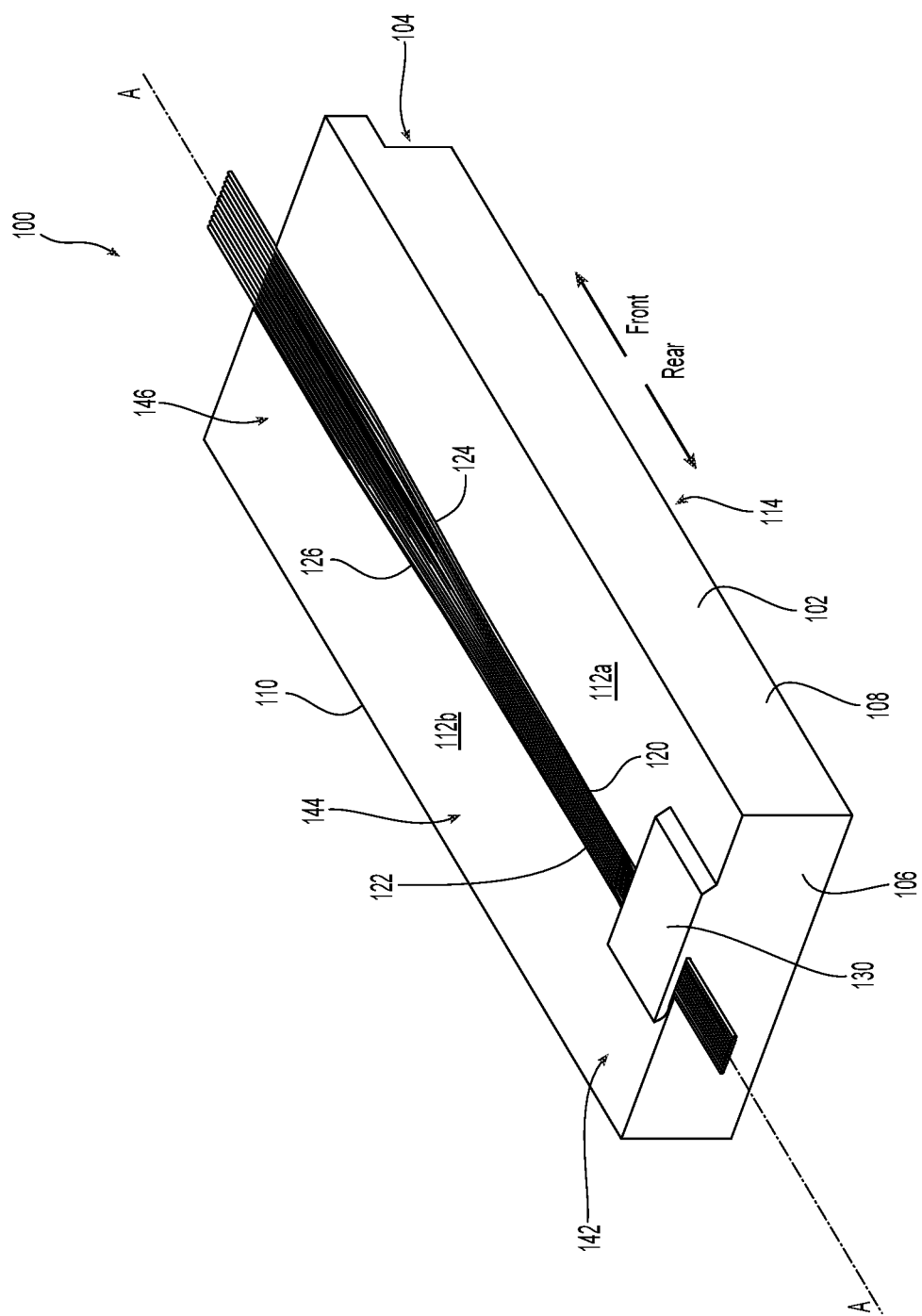
FIG. 1 is a perspective view of one embodiment of an optical fiber arranging tool according to one embodiment of the present invention.

Reference will now be made in detail to the present preferred embodiment(s) of the invention, examples of which are illustrated in the accompanying drawings. Whenever possible, the same reference numerals will be used throughout the drawings to refer to the same or like parts.

One embodiment of an optical fiber arranging tool 100 is illustrated in FIG. 1. The optical fiber arranging tool 100 has a base 102 that extends between a front end 104 and a rear end 106. The base 102 is illustrated as having a rectangular shape, with the front end 104 and the rear end 106 as being flat surfaces that are parallel to one another. Additionally, the base 102 has two side surfaces 108 and 110, which are parallel to one another and generally perpendicular to the front and rear ends 104, 106. However, the base 102 may have many different configurations, shapes, and surfaces and still fall within the scope of this application. For example, the front and rear ends 104, 106 may not be perpendicular to the side surfaces 108 and 110. Additionally, front and rear ends 104, 106 and the side surfaces 108 and 110 may not be planar as illustrated. As noted below, the base 102 provides the structure for the recessed channel 120.

The base 102 also includes a top surface 112 and a bottom surface 114. The top surface 112 may or may not be parallel to the bottom surface 114. Preferably, the top surface 112 is smooth and has a recessed channel 120 extending from the top surface 112 into the base 102 in the direction of the bottom surface 114. The recessed channel 120 preferably divides the top surface into two portions, 112a and 112b. While the two portions 112a and 112b are illustrated as being the same (width, length, configuration, etc.) on both sides of the recessed channel 120, they need not be identical. The recessed channel 120 has a longitudinal axis A that passes therethrough. Additionally, while it is preferable that the longitudinal axis A is perpendicular to the front end 104 and the rear end 106 and parallel to the sides 108 and 110, again, it need not be. As noted above, the front end 104 and the rear end 106 and the sides 108, 110 may have different configurations preventing the longitudinal axis A from being perpendicular to these structures.

The recessed channel 120 preferably extends between the front end 104 and the rear end 106 and has a bottom surface 122, a first side wall 124 and a second side wall 126. While the recessed channel 120 is illustrated as extending the entirety of the length of the base 102, it could extend only along a portion of the length between the front end 104 and the rear end 106. For example, the recessed channel 120 may not start at the front end 104, but could start between the front end 104 and the rear end 106. Similarly, the recessed channel may end before reaching the rear end 106.

The recessed channel 120 has a width W at the rear end 106 (or wherever it were to start along the length of the base 102) that preferably corresponds to the width of the number of optical fibers 200 that are to be oriented. Typically, the number of fibers correspond to the number of openings in a fiber optic ferrule—2, 4, 8, or 12. However other numbers of optical fibers could be accommodated as well. Thus, if there were 12 optical fibers to be arranged and the optical fibers had a diameter of 200 microns, then the recessed channel 120 would have a width of 2.4 mm. At the other end, the recessed channel 120 would have a width of 3.0 mm (12×0.250 mm) to match to the existing openings in the fiber optic ferrules. Preferably there would one tool for each of the different numbers of optical fibers to be arranged. Alternatively, customized widths of the recessed channel 120 may be provided depending on the number of optical fibers that need to be terminated.

The optical fiber arranging tool 100 also has a latch 130 that extends from one side of the recessed channel 120 to the other side. Thus, the latch 130 is attached to the base 102 on the first portion 112a of the top surface 112 and extends across the recessed channel 120 to the second portion 112b of the top surface 112. The latch 130 could be made integrally with the base 102 or it could be added later and secured to the base in any appropriate manner.

Figure 2:
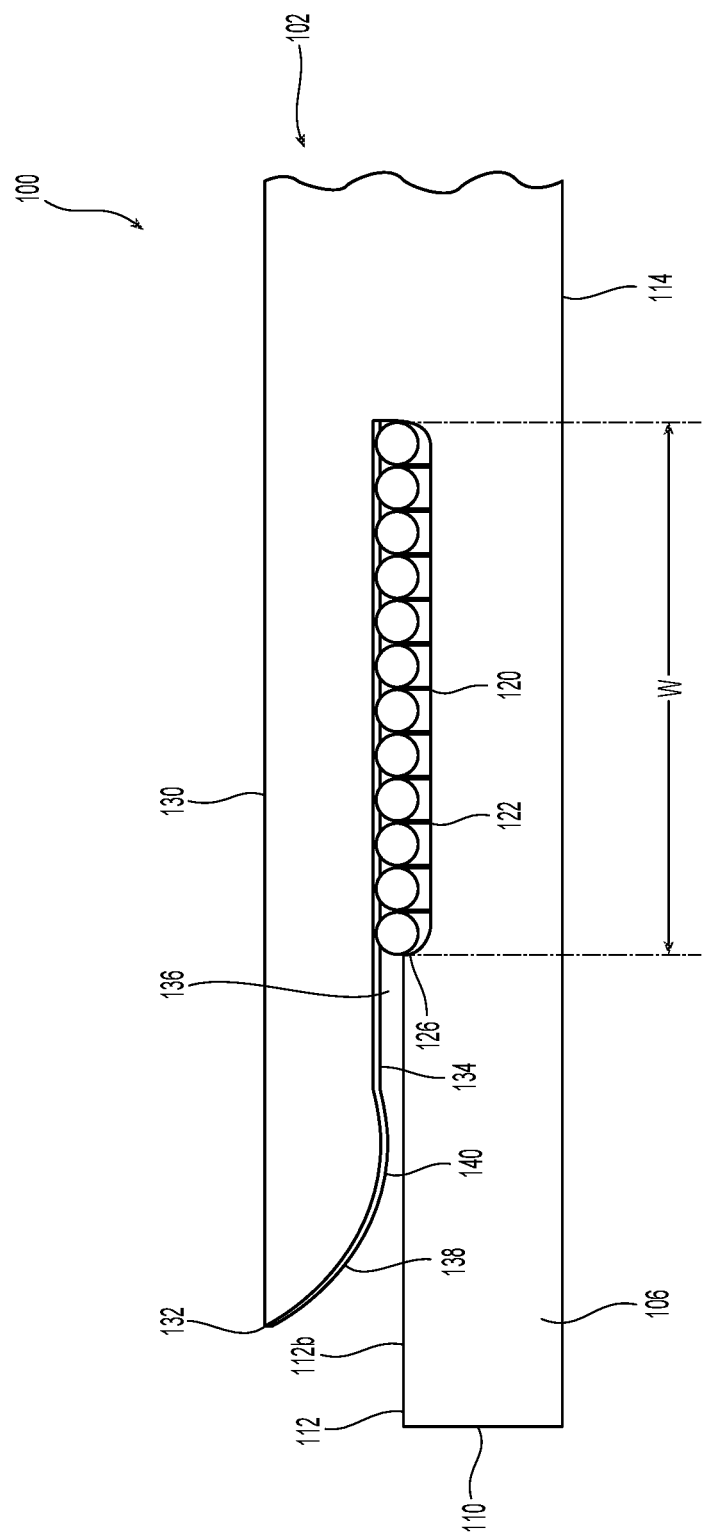
FIG. 2 is a rear elevational view of the optical fiber arranging tool in FIG. 1.
Figure 3:
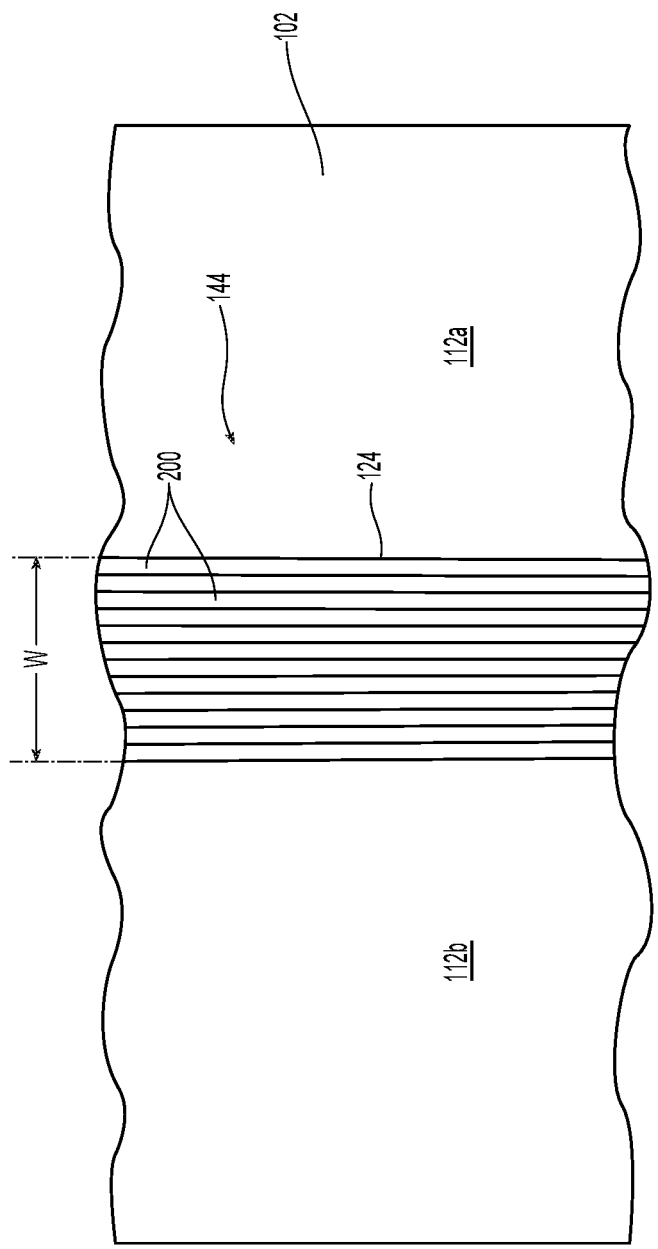
FIG. 3 is a top view of the optical fiber arranging tool in FIG. 1 of a portion of the recessed channel.

As best seen in FIG. 2, the latch 130 extends from the top surface portion 112a across the recessed channel 120 and above the top surface portion 112b at a terminal point 132. The latch 130 has an under surface 134 to define a slot 136 between the latch 130 and the recessed channel 120 as well as the top surface portion 112b. The latch 130 has a chamfered portion 138 that extends from the terminal point 132 to the underside 134. The chamfered portion 138 creates a narrowed portion 140 of the slot 136 at the end of the underside 134 and above the top surface portion 112b. The narrowed portion 140 of the slot 136 is preferably less than the diameter of the optical fibers 200 that are inserted, i.e., less than 200 microns. The latch 130 is flexible to allow it to be flexed upward away from the top surface portion 112b when the optical fibers 200 are inserted into the recess channel 120. This spacing of the narrowed portion 140 prevents the optical fibers 200 from accidentally slipping out from underneath the latch 130. Additionally, the slot 136 between the underside 134 and the recessed channel 120 is less than the diameter of two optical fibers 200 (less than 400 mm) to prevent the optical fibers 200 from sliding past one another in the recessed channel 120. This will maintain the order of the optical fibers 200 within the channel, for example, by their colors: blue, orange, green, brown, slate, white, red, black, yellow, violet, rose, and aqua. Thus, this area around the latch 130 can be referred to as the organizing area 142. See FIG. 3.

In a portion of the recessed channel 120 between the latch 130 and the front end 104, there is a positioning area 144 for the optical fibers 200 that have been inserted under the latch 130. The optical fibers 200 are loose and have the ribbon matrix/adhesive removed. One could place the optical fibers 200 into the positioning area 144 before sliding them into the space 136, or after, depending on the user's preference for inserting the optical fibers 200. The positioning area 144 has a width that is preferably the same as the width of the recessed channel 120 at the latch 130—the organizing area 142.

Figure 4:
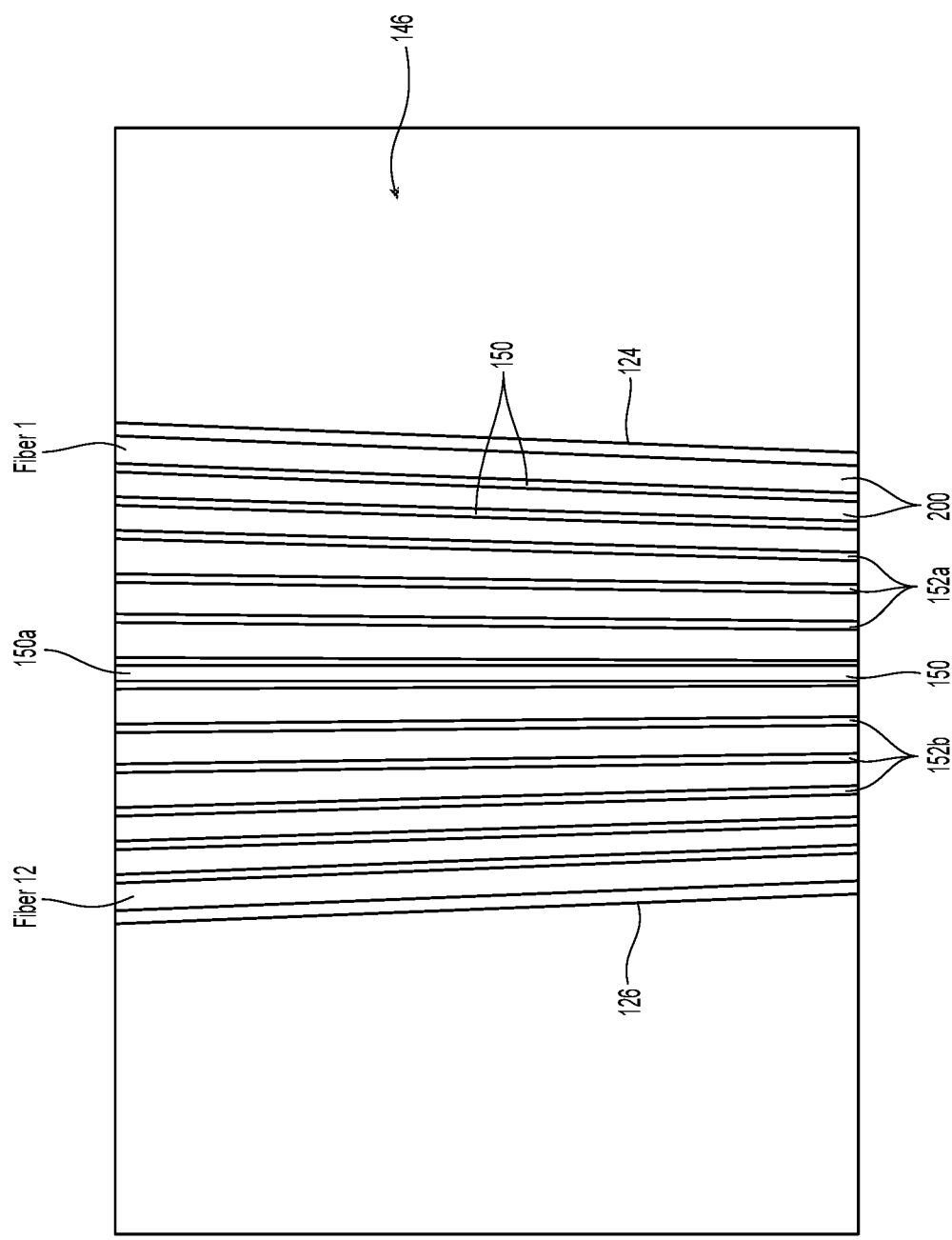
FIG. 4 is a top view of the optical fiber arranging tool in FIG. 1 of a portion of the recessed channel showing some of the plurality of ribs.

With the optical fibers 200 being in the correct order in the organizing area 142, the user can press on the optical fibers 200 in the positioning area 144 with a finger or other object (and on the top surface portions 112a/112b) and move the finger or object toward the front end 104. This pressure will move the optical fibers 200 along their length into the correct order along the recessed channel 120 in the positioning area 144. Moving toward the front end 104 of the base 102 and in the separating area 146, the recessed channel 120 begins widening to allow for the proper spacing of the optical fibers 200. See FIG. 4. The recessed channel has the first side wall 124 and the second side wall 126 to retain the optical fibers 200 therein. Preferably the recessed channel 120 has a depth (and the first and second side walls 124,126 have a height) of at least one half of the diameter of the optical fibers 200 (deeper than a fraction of the optical fiber's diameter), i.e., at least 100 microns. Preferably, the depth would not be larger than the diameter of the optical fibers, although there is no real downside to having it deeper.

Figure 5:
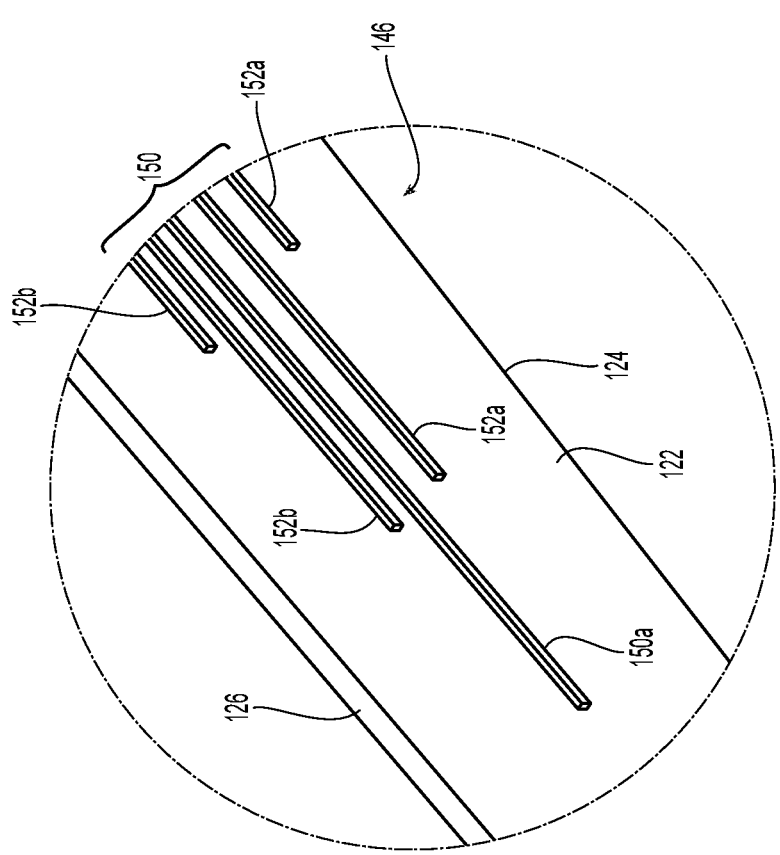
FIG. 5 is a perspective view of the portion of the recessed channel showing some of the plurality of ribs from FIG. 4.
Figure 6:
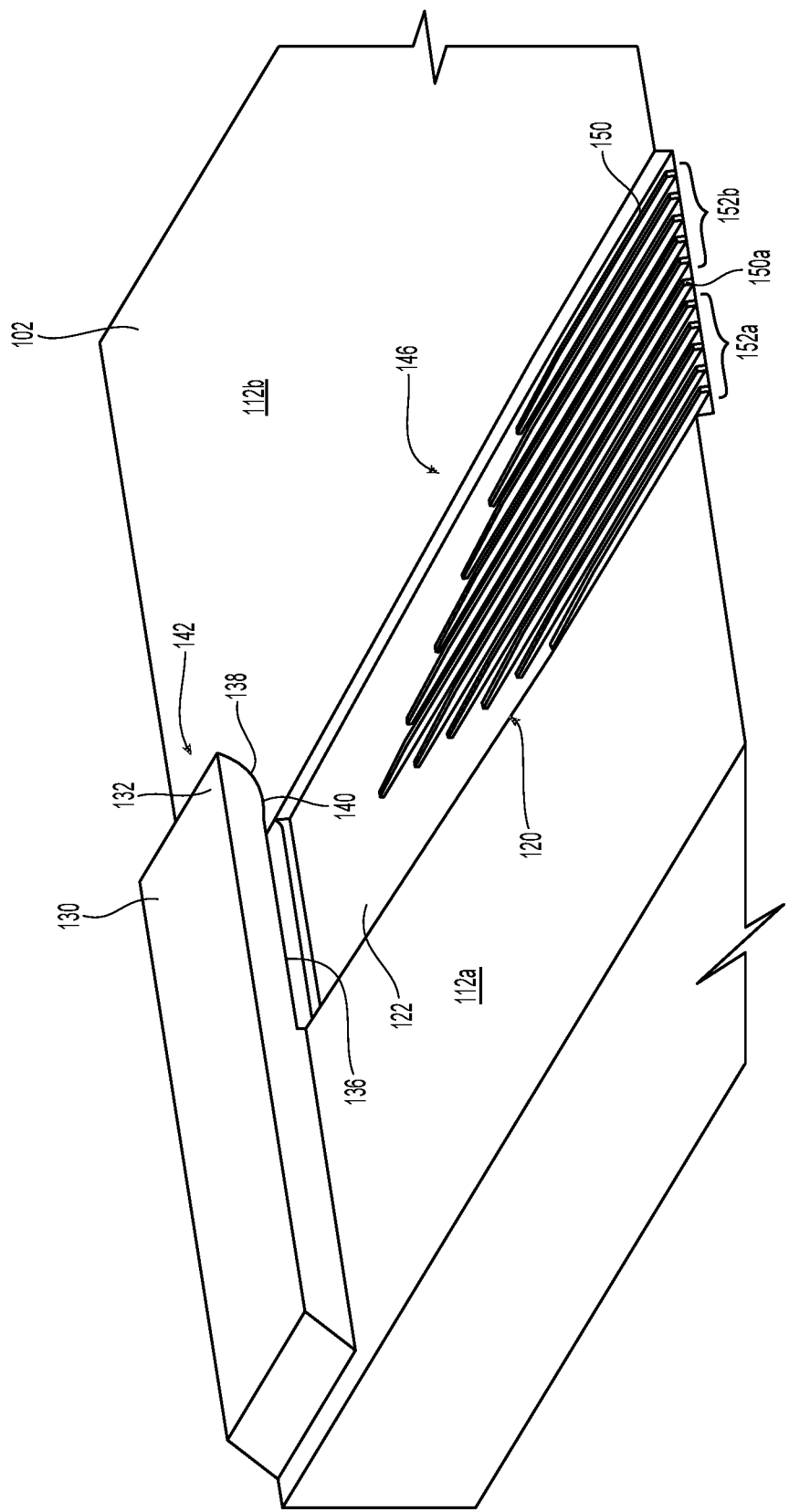
FIG. 6 is a front perspective view of the optical fiber arranging tool.

In the recessed channel 102 towards the front end 104, there are a plurality of ribs 150 that are disposed on the bottom surface 122 and between the first side wall 124 and the second side wall 126. See FIGS. 5 and 6. The plurality of ribs 150 could be integrally formed with the base 102 or can be attached to the bottom surface 122 later. Preferably the plurality of ribs 150 have the same height as the first side wall 124 and the second side wall 126. It is possible that some of the plurality of ribs 150 have a different height than others of the plurality of ribs 150. The plurality of ribs 150 preferably terminate at the front end 104. However, it is possible that they terminate prior to the front end 104. The plurality of ribs 150 have a width WR that allows for the optical fibers 200 to have a pitch of 250 microns on centers. That is, the centers of the optical fibers 200 are spaced at 250 microns. See, e.g., FIGS. 7A-C

The plurality of ribs 150 have a central rib 150a that is longer than all of the other of the plurality of ribs 150. On each side of the central rib 150a is a respective second plurality of ribs 152a/152b with each of the ribs in each of the second plurality of ribs 152a/152b getting shorter moving away from the central rib 150a. Thus, the ribs next to the first side wall 124 and the second side wall 126 are the shortest of the ribs. While it is preferable that the length of the ribs in each of respective second plurality of ribs 152a/152b are the same (e.g., the third rib on either side of the central rib 150a), it is possible for them to have other lengths than the corresponding rib on the opposite side of the central rib 150a.

As the user pushes a finger/object along the optical fibers 200 toward the front end, the central rib 150a will divide the optical fibers 200 into two groups of the same size. For those cases where 12 optical fibers are used, the central rib 150a will divide the optical fibers 200 into two groups of 6 optical fibers. If there are only 8 optical fibers and the base is configured to receive 8 optical fibers, then the central rib would divide the optical fibers into two sets of 4 optical fibers.

For discussion purposes, the number of optical fibers 200 will be assumed to be 12. With 12 optical fibers, there would therefore need to be 11 ribs—one central rib and then five ribs on either side thereof. See FIG. 6. After the optical fibers are divided into two groups of six fibers, the two optical fibers on either side of the central rib 150 (fibers 6 and 7) are then separated from the two pluralities of optical fibers. Moving farther toward the front end 104, then the next two fibers (5 and 8) are separated. This process continues (4 and 9; 3 and 10; 2 and 11; and 1 and 12) until all 12 optical fibers 200 are separated from one another. See FIG. 4. Since the plurality of ribs 150 have arranged such that the core of the optical fibers 200 are on 250 micron pitch, the optical fibers 200 can be glued on the base 102 to retain the optical fibers on the 250 micron pitch and inserted into the appropriate receptacle (fiber optic connector, fiber optic ferrule, plug, etc.). The receptacle can then be terminated as with the prior devices and spacing.

Figure 7A:
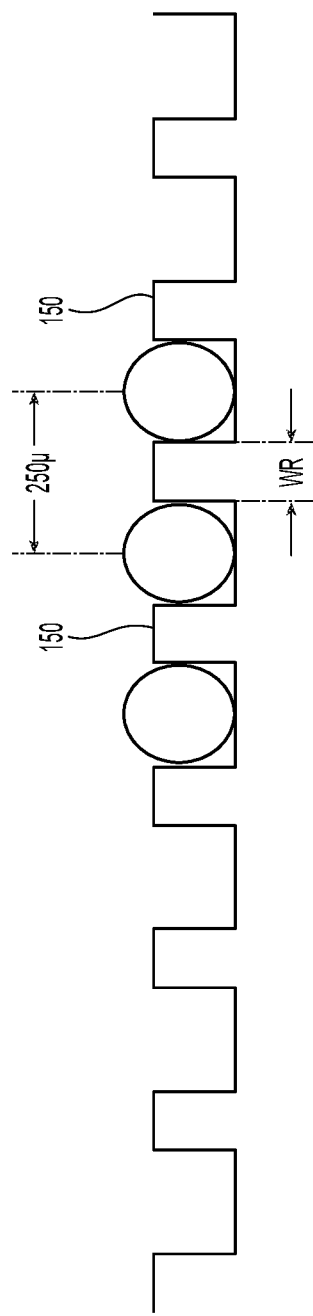
FIGS. 7A-C are end views of cross sections of ribs that may be used with the optical fiber arranging tool.
Figure 7B:
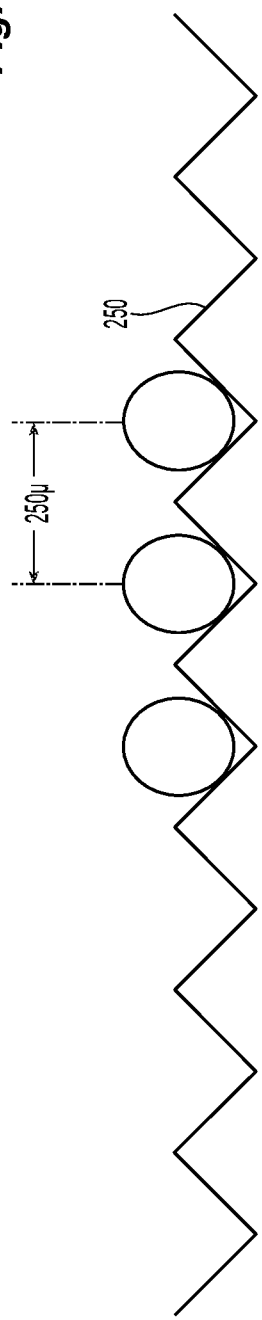
Figure 7C:
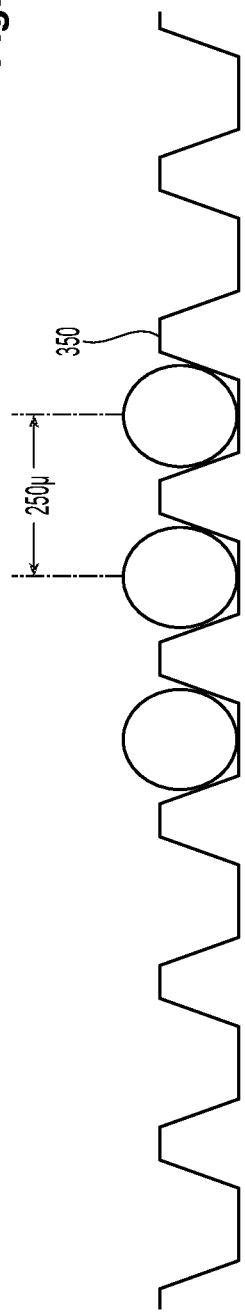

The plurality of ribs 150 may take a variety of shapes, provided that they cause the optical fibers to have a 250 micron pitch. As illustrated in FIG. 7A, the plurality of ribs 150 may have a rectangular cross section. In FIG. 7B, the plurality of ribs 250 are illustrated as being v-grooves and FIG. 7C shows the plurality of ribs 350 as being of a frustoconical shape. Other cross-section shapes of the ribs include shapes that create U-shaped grooves or U-grooves between the plurality of ribs. It should be noted that the plurality of ribs need allow the optical fibers 200 to have enough exposed area to allow the adhesive used to form a sufficient bond to the optical fibers 200 to retain them at the correct pitch without coming apart or breaking.

Figure 8:
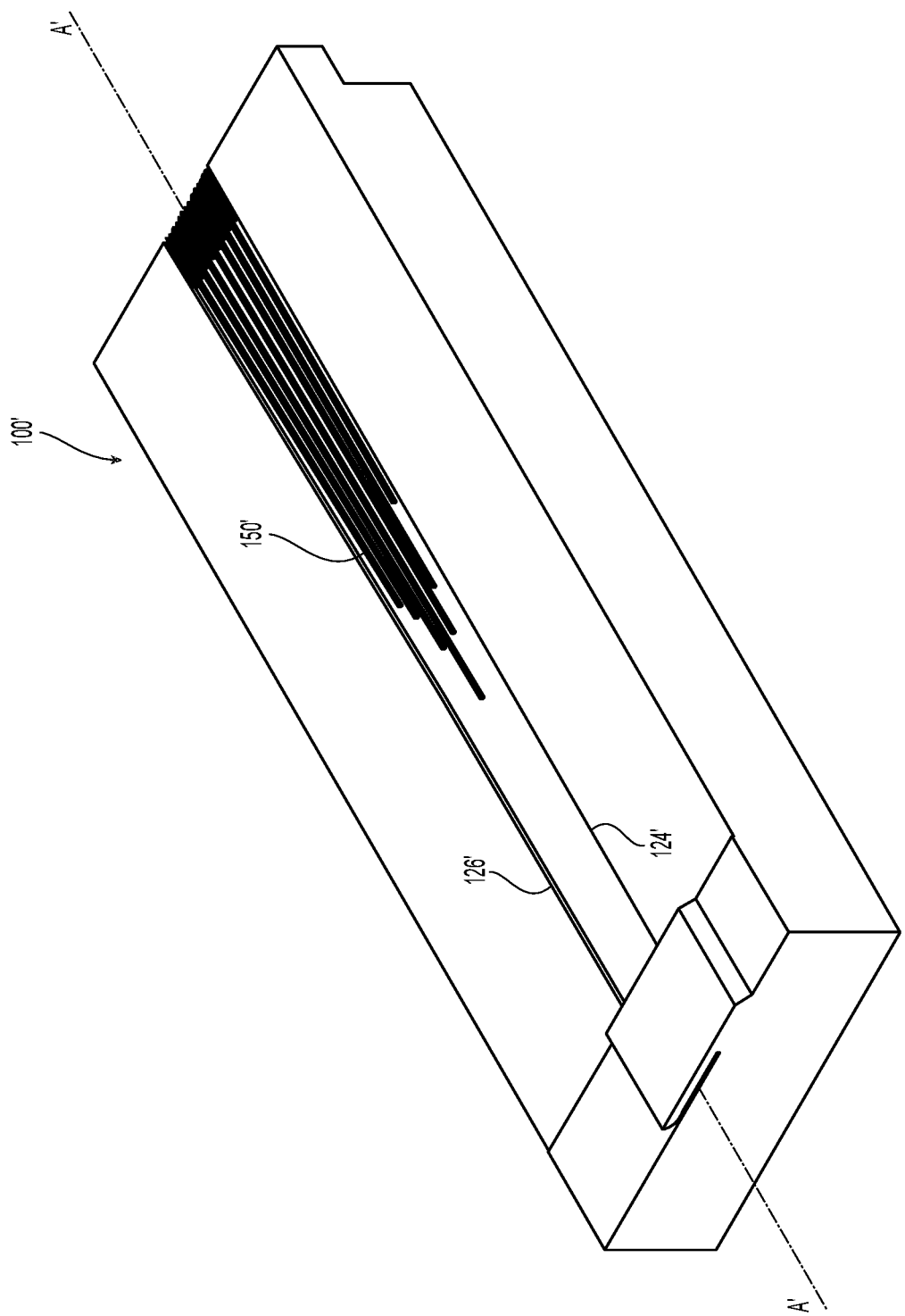
FIG. 8 is a rear perspective view of another embodiment of an optical fiber arranging tool according to the present invention.
Figure 9:
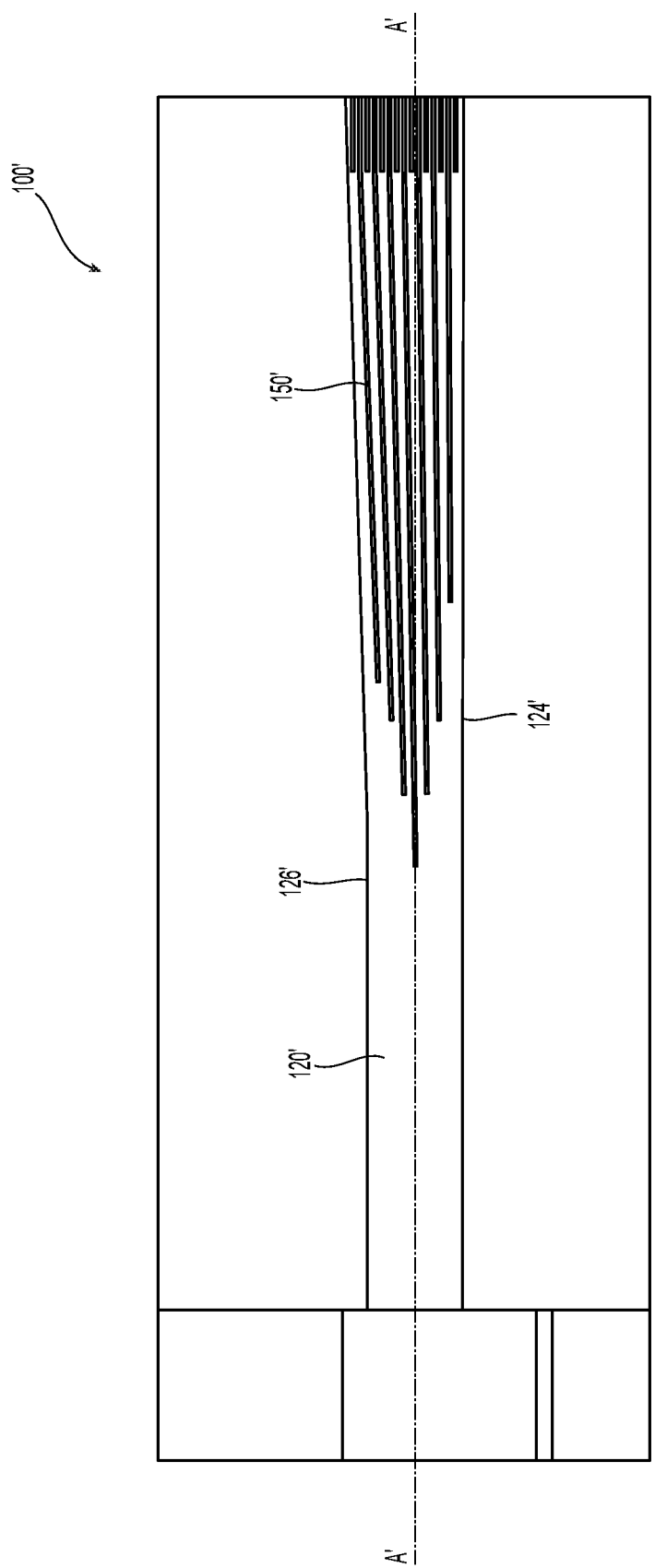
FIG. 9 is a top view of the optical fiber arranging tool in FIG. 8.

As noted above, the recessed channel 120 has the organizing area 142 and the positioning area 144 with two parallel side walls (first side wall 124 and the second side wall 126) and then the side walls diverge from one another at the separating area 146. As illustrated in FIGS. 8 and 9, another embodiment of a second optical fiber arranging tool 100' illustrates that it is possible for one of the side walls, the first side wall 124', to be parallel to longitudinal axis A' along the entire length of the base 102'. It should be noted that the second side wall 126' could alternatively be the one that is parallel to the longitudinal axis A'. In this embodiment, the recessed channel 120' is sized for only eight optical fibers 200.

Another change in optical fiber arranging tool 100' is that the plurality of ribs 150' are increasingly turned or tilted relative to the longitudinal axis A' (i.e., non-parallel to one another). Starting at the first rib by first side wall 124' (at the bottom of the recessed channel 120' in FIG. 9), the ribs are increasing turned in a counter-clockwise rotation—that is there is smaller distance between adjacent ribs at the rear end of the tool than at the front end. This turning of the ribs, and therefore the plurality of optical fibers, allows for the change in width (from 2.4 mm to 3.0 mm) of the 12 optical fibers as the spacing is changed from 200 microns to 250 microns.

Figure 10:
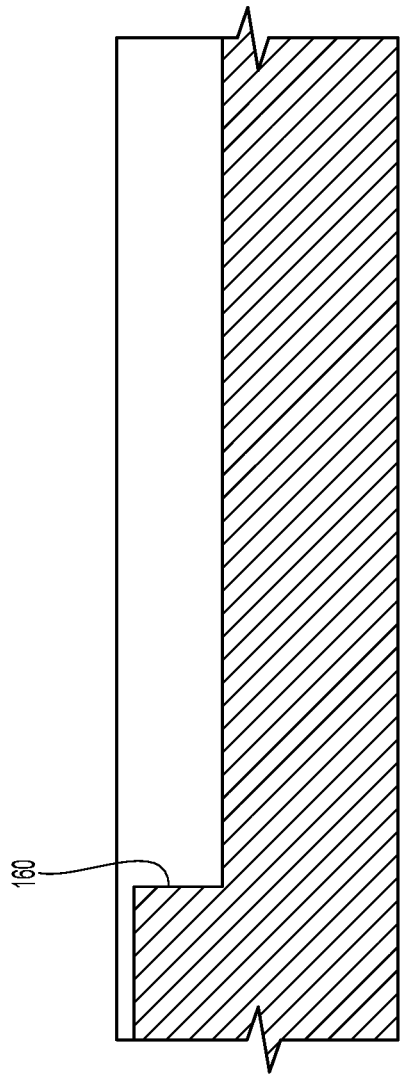
FIG. 10 is a partial cross section view of another embodiment of an optical fiber arranging tool with the recessed channel having a step-down portion.
Figure 11:
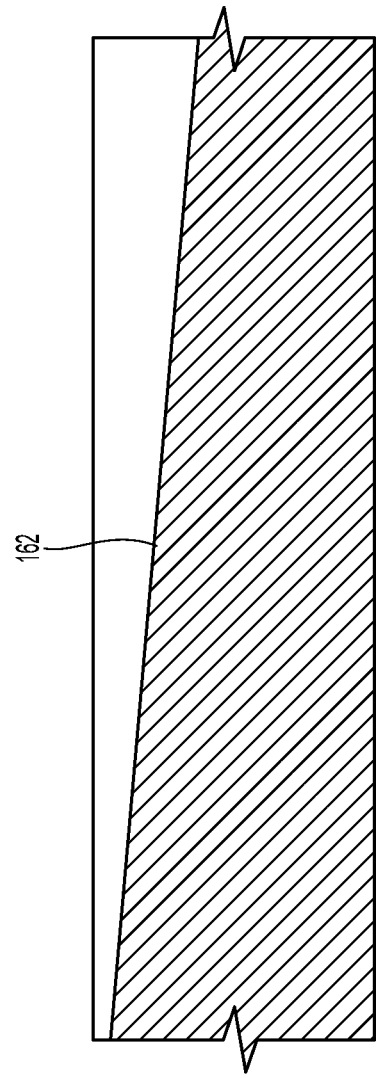
FIG. 11 is a partial cross section view of another embodiment of an optical fiber arranging tool with the recessed channel having a ramp portion.

The recessed portion 120 (and 120') has been illustrated in the prior figures as being flat from one end of the base 102 to the other. However, it is possible that there be a step 160 in the recessed portion between the latch 130 and the plurality of ribs. See FIG. 10. Alternatively the recessed portion 120 (and 120') may also have a ramp configuration 162 as illustrated in FIG. 11.

Another embodiment of an optical fiber arranging tool 400 is illustrated in FIGS. 12 and 13. The optical fiber arranging tool 400 has a base 402 that extends between the front end 404 and a rear end 406. The base 402 as a recessed channel 420 extending between the front end 404 and the rear end 406 and between the first side wall 424 and the second side wall 426. At the front end 404 is a stacker 430 that receives in a slot 436 the optical fibers (not shown). The optical fibers would be inserted into the slot 436 in the correct order. As illustrated in FIG. 12, stacker 430 can be rotated up so that the optical fibers can be inserted into the slot 436. Preferably, a small portion of the length of the optical fibers would extend to the right of the stacker 430, while a larger portion would extend to the left and preferably beyond the rear end 406 of the base 402. The user would ensure that the optical fibers are oriented in the correct order by running their fingers (or another appropriate object) along the optical fibers extending from the stacker 430 to the left. The user would then rotate the stacker 430 downward as the user aligns with the optical fibers with the recessed channel 420 at the rear end 406. Running a finger or other appropriate object along the optical fibers and pressing them onto the bottom surface 422 in the recessed channel 420, which causes the optical fibers to engage the plurality of ribs 450 and separate at the appropriate spacing as with the prior embodiments.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. An optical fiber arranging tool comprising:
    a base having a front end, a rear end, a top surface, a bottom surface, and a recessed channel extending along the base from the rear end to the front end of the base, the recessed channel having a portion of the top surface on either side thereof;
    a latch extending from the top surface of the base on one side of the recessed channel and across the recessed channel to a second side of the recessed channel, there being a slot between the top surface of the base and an underside of the latch and in communication with the channel; and
    a plurality of ribs disposed within the recessed channel having a pitch of 250 microns creating a plurality of grooves at the front end.

2. The optical fiber arranging tool according to claim 1, wherein the recessed channel has a bottom surface and two side walls, the bottom surface being at least half a fiber diameter below the top surface of the base.

3. The optical fiber arranging tool according to claim 1, wherein the slot is about 0.200 mm tall.

4. The optical fiber arranging tool according to claim 2, wherein the two side walls diverge from one another along a portion of a length of the base.

5. The optical fiber arranging tool according to claim 1, wherein the recessed channel has a first width at the rear end and a second width at the front end, the first width being smaller than the second width.

6. The optical fiber arranging tool according to claim 2, wherein the recessed channel has central axis at the rear end, one of the side walls being parallel to the central axis along the length of the recessed channel.

7. The optical fiber arranging tool according to claim 2, wherein the recessed channel has central axis at the rear end, at least one of the side walls having a first portion that is parallel to the central axis and a second portion that is non-parallel to the central axis.

8. The optical fiber arranging tool according to claim 2, wherein the recessed channel has central axis at the rear end, one of the side walls being non-parallel to the central axis along the length of the recessed channel.

9. The optical fiber arranging tool according to claim 1, wherein the recessed channel has a positioning area for a plurality of optical fibers.

10. The optical fiber arranging tool according to claim 1, wherein the plurality of ribs terminate at the front end, the plurality of ribs comprising a central rib having a first length and a second plurality of ribs disposed on either side of the central rib, each of the second plurality of ribs having a length that is shorter than the length of the rib adjacent thereto.

11. The optical fiber arranging tool according to claim 1, wherein the ribs have a rectangular cross section.

12. The optical fiber arranging tool according to claim 1, wherein the ribs have an inverted-V cross section.

13. The optical fiber arranging tool according to claim 1, wherein the ribs have a frustoconical cross-section.

14. A method for arranging optical fibers at a pitch greater than a diameter of the optical fibers in tool having a base with a top surface and a recessed channel in the base with a portion of the top surface on either side of the recessed channel, the method comprising:
    sliding individual optical fibers one by one into a slot and into the recessed channel;
    moving an object along the optical fibers in the recessed channel from the slot towards an end of the base;
    passing the individual optical fibers through a respective one of a plurality of grooves created by ribs within the recessed channel; and
    maintaining the individual optical fibers at a distance of 0.250 mm at an end of the recessed channel.

15. The method of claim 14, further comprising:
    applying an adhesive to the optical fibers inside the recessed channel;
    inserting the arranged optical fibers into an MT fiber optic ferrule; and
    terminating the MT fiber optic ferrule.

16. An optical fiber arranging tool comprising:
    a base having a recessed channel extending along the base from adjacent a rear end to a front end of the base;
    a stacker associated with the base at the front end, there being a slot in the stacker to receive optical fibers to be arranged, the slot having a width that is less than twice the diameter of the optical fibers; and
    a plurality of grooves disposed within the recessed channel having a pitch of 250 microns at the front end.

17. The optical fiber arranging tool according to claim 16, wherein a bottom surface of the recessed channel includes an inclined portion between the rear end and the front end.

18. The optical fiber arranging tool according to claim 16, wherein the recessed channel includes a step between the rear end and the front end.

19. The optical fiber arranging tool according to claim 16, wherein the plurality of grooves have a U-shaped cross section.

* * * * *